Feb. 14, 1956 — B. J. ALECK — 2,734,762
RETAINING DEVICE
Filed May 17, 1952 — 2 Sheets-Sheet 1

Benjamin J. Aleck
INVENTOR.

Feb. 14, 1956 B. J. ALECK 2,734,762
RETAINING DEVICE
Filed May 17, 1952 2 Sheets-Sheet 2

Benjamin J. Aleck
INVENTOR.

BY Virgil F. Davies
   Attorney

United States Patent Office 2,734,762
Patented Feb. 14, 1956

2,734,762
RETAINING DEVICE

Benjamin J. Aleck, Brooklyn, N. Y., assignor to The M. W. Kellogg Company, Jersey City, N. J., a corporation of Delaware Application May 17, 1952, Serial No. 288,401

4 Claims. (Cl. 292—256.6)

This invention relates to retaining devices and in particular to a novel retaining device and a novel snap-ring therefor.

Retaining devices employing snap-rings as connectors between retaining and retained elements are in widespread present day use. In these devices, a groove in the retaining member houses a portion of the snap-ring while the remainder of the snap-ring extends toward the retained element to be engaged by a surface thereon to thereby form the desired joint. In the prior art retaining devices of this character, the snap-rings always act as shear connectors. Thus, when large forces are involved, as well as when accurate positioning of the retained element relative to the retaining element is required, the snap-ring and its groove must be made to such close longitudinal tolerances that the force transmitting portions of the surface of the snap-ring fit snugly against the corresponding portions of the surface of the groove. These tolerances are difficult to obtain and consequently, materially increase the cost of the retaining device. Also, when large forces are involved, the groove must be deep enough to hold the snap-ring in position against the action of said forces. This usually requires over-designing the section of the retaining element to compensate for the weakening thereof by said groove.

It is a principal object of this invention to provide a novel retaining device and a novel snap-ring therefor, which are cheap to manufacture and may be easily and quickly assembled and disassembled, said device and snap-ring being so constructed and arranged that said snap-ring behaves essentially as a column in transmitting the forces involved in forming the joint between the retained and the retaining elements.

It is also a principal object of this invention to provide a novel retaining device, including a novel snap-ring therefor which behaves essentially as a short column in transmitting the forces involved in forming the joint between the retained and the retaining elements and is light in weight as compared to the magnitude of said forces, in which the groove in the retaining element required to support said snap-ring involves a minimum weakening of the retaining element, thereby obviating weight increasing re-enforcement thereof, and in which the significant tolerances are largely radial and easily attainable.

It is a further principal object of this invention to provide a novel snap-ring of great strength in proportion to its weight which is in the form of a frustum of a cone and can be easily and cheaply manufactured.

The further features, objects and advantages of the invention will be apparent from a consideration of the following description of a present preferred embodiment thereof taken with the accompanying drawings in which.

Figure 1:
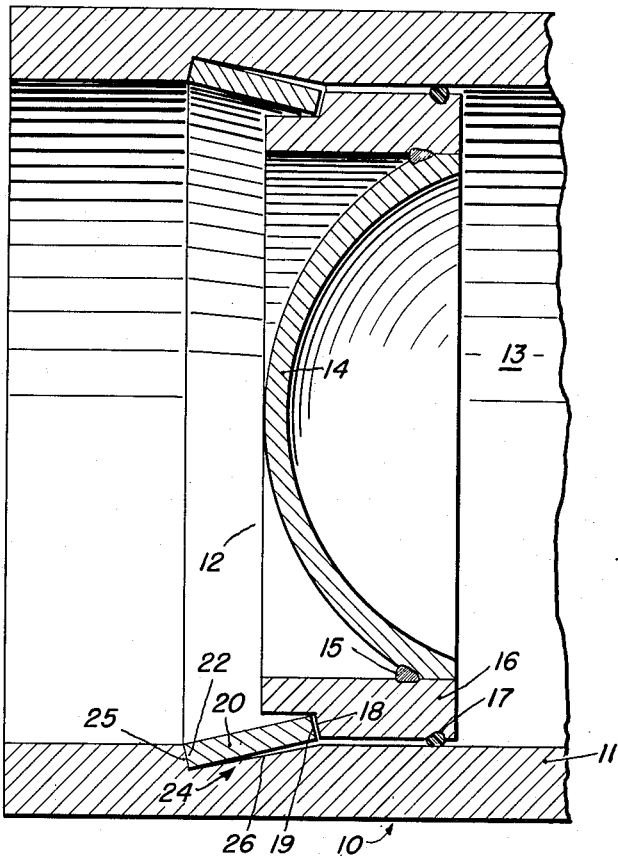
Fig. 1 is a longitudinal sectional view of a portion of a pressure vessel with an enclosure therefor held in position by the novel retaining device of the invention.
Figure 2:
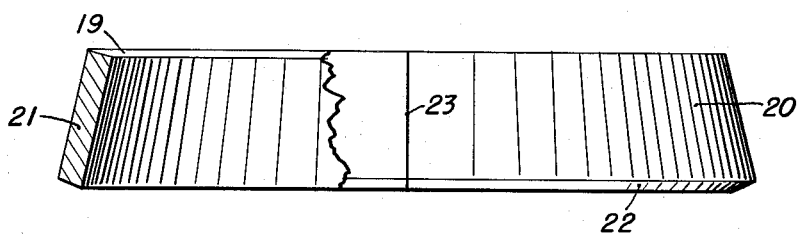
Fig. 2 is a front view, partly in section, of the novel snap-ring.

While the novel retaining device of the invention is of general application, it will for the purposes of this disclosure be described in connection with a rocket device. The rocket device 10 includes a cylindrical shell 11 carrying at one end the closure 12 and at the other end an exhaust nozzle configuration, not shown. These elements define the pressure chamber 13 wherein the propellant gases are produced by the interaction of suitable propellants. The closure 12 may include the nozzle structure, not shown, employed for introducing the propellants into the pressure chamber 13 and comprises a dished section 14 suitably united as by the weld 15 to the ring section 16. The circumferential groove which retains the O-ring seal 17, formed of a suitable deformable material, is provided adjacent the inner end of the ring section 16 and seals its respective end of the pressure chamber 13. The outer end of the ring section 16 is reduced in section to provide a frusto-conical shoulder 18 upon which the frusto-conical surface 19 at the smaller end of the frusto-conical snap-ring 20 is adapted to bear in joint forming relation therewith.

The snap-ring 20 is a frustum of a cone showing the section 21, in the planes that included the axis of generation, as a rectangle, with the long and short sides so proportioned that when in compression, it behaves as a short column. The short side of the section 21 at the smaller end of the snap-ring 20, generates the frusto-conical end surface 19, above referred to, while the short side of the section 21 at the larger end of the snap-ring 20 generates the frusto-conical end surface 22. The snap-ring 20 is parted at 23 along a section 21. The frusto-conical snap-ring 20 may be conveniently fabricated from bar stock of proper cross section by a simple rolling operation and brought to finished size by a simple grinding operation. A properly designed snap-ring 20 is the lightest configuration that can be employed as a joint forming member, since a short column has the greatest strength for the weight involved. While a snap-ring of rectangular section 21 is shown, and is at present preferred, frusto-conical snap-rings of other shaped cross section may be employed provided said other shaped cross section provides a force and moment distribution approximating those disclosed hereinafter in connection with the snap-ring 20.

Shell 11 has an annular notch groove 24 formed therein to provide the frusto-conical surface 25 upon which the frusto-conical surface 22 of the snap-ring 20 is adapted to seat. The other frusto-conical surface 26 of the notch groove 24 is disposed at an angle somewhat greater than 90° relative to the surface 25 to provide the clearance necessary to accommodate the snap-ring 20 in the unloaded condition and to provide for the insertion and removal of the snap-ring 20.

In assembling the joint and after the O-ring 17 is positioned in its housing groove, the closure 12 is inserted in the shell 11 and moved inwardly until it clears the notch groove 24.

The snap-ring 20 having been coiled slightly to reduce its diameter in the usual manner, is placed in the notch groove 24 and sprung back to its full diameter to seat its surface 22 on the surface 25. The closure 12 is then moved outwardly until the snap-ring surface 19 seats on the surface of the shoulder 18. As the pressure within the pressure chamber 13 rises to operating levels, the closure 12 through the surface 18, and the shell 11 through the surface 25, apply the longitudinal forces L to the snap-ring 20, Fig. 3. Since the forces L are not collinear, they act through a lever arm 1 to apply the torque L1 to each section 21. Since the snap-ring 20 has negligible resistance to torque, said torque L1 will cause each section 21 of the snap-ring 20 to twist until the radial bearing forces R produce a couple $Rr=L1$. This twisting of the snap-ring 20 upon load application to an ultimate equilibrium position assures a tight joint between the snap-ring 20 and the shell 11 and between the snap ring 20 and the closure 12. It is to be noted that the greater the load applied, the greater the tendency to twist the section 21; hence, the tighter the joint. Once the couple $Rr=L1$ is produced and the internal pressure on the closure 12 remains unchanged, in other words whenever the closure arrangement attains what might be called a steady state condition, there is no further tendency to twist the snap ring 20 and the ends 19 and 22 of each of the component sections 21 of the snap ring 20 will be loaded by the forces L and R.

Figure 3:
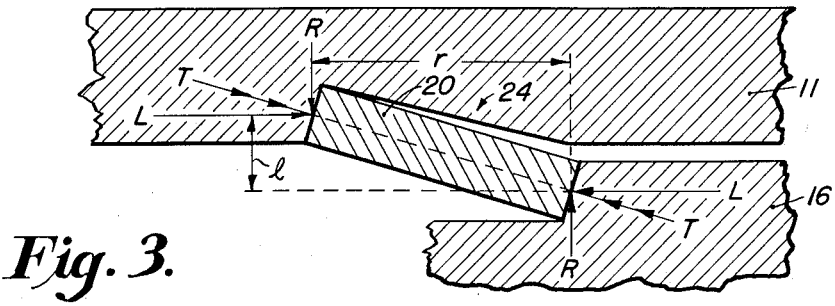
Fig. 3 is an enlarged fragmentary sectional view similar to Fig. 1, illustrating the forces acting on the novel retaining device.

It is apparent from elementary mechanics, and as shown in Fig. 3, that the forces L and R have the resultant T at both sides of the snap-ring 20 and that these resultants T are collinear column forces on each section 21 of the snap-ring 20. Hence, once the joint is formed each component section 21 of the ring 20 acts as a short column under pure compression loading by the opposed collinear resultants T.

Figure 4:
Fig. 4 is a fragmentary sectional view illustrating the manner in which the forces act on the retaining element.
Figure 5:
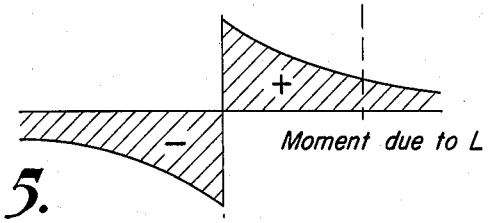
Figs. 5, 6 and 7 are moment diagrams based on Fig. 4.
Figure 6:
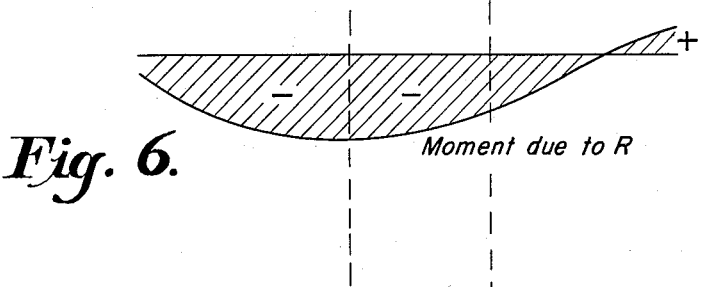
Figure 7:
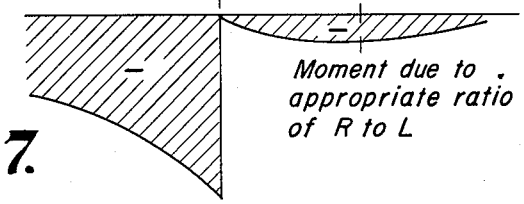

In Fig. 4 is shown the manner in which the forces L and R act upon the wall of the shell 11 in the region of the notch groove 24. In Figs. 5–7 various bending moments in the region of the notch groove 24 are plotted in the conventional manner. The abscissas in Figs. 5–7 represent the distance along the shell 10 as measured from the notch root and the ordinates represent the magnitude of the bending moments. The notch groove is projected from Fig. 4 onto Figs. 5, 6, and 7 by vertical dotted lines. In Fig. 5, the bending moments due to the force L are plotted. These bending moments are essentially the same as those for a shear type snap-ring connector and it is to be noted that a large positive bending moment exists at the notched section of the shell 11. In Fig. 6, the bending moment due to R is plotted. It is to be noted that in the notched region of the shell 11, the bending moment is negative. From these moment diagrams, it is apparent that if the ratio of R to L is adjusted properly the positive bending moment in the region of the shell 11, Fig. 5, can be cancelled by the negative bending moment, Fig. 6. This result is shown in Fig. 7. As shown in Fig. 7, the result is a large bending moment, twice that of Fig. 5 in the unnotched section of the shell 11 and a small bending moment in the notched section of the shell 11. Since the bending strength of a member varies as the square of its thickness, the unnotched region of the shell 11, being the full thickness of said shell 11, will be more than adequate to resist the stresses imposed due to the large moment; while the bending stresses in the weakened section of the shell 11 are small and are kept well within its ability to resist them. From this it appears that by proper choice of cone angle for the snap-ring 20 and geometry for the notch groove 24, the thickness of the shell 11 can be made much smaller, and its weight materially reduced, than when a conventional shear type snap-ring is employed.

Since many changes may be made without departing from the scope of the invention herein involved, it is intended that all matter contained in the above description or shown in the accompanying drawings shall be interpreted as illustrative and not limitative.

What is claimed is:

1. A retaining device comprising a retaining member, a retained member laterally adjacent and longitudinally movable relative to said retaining member, each of said members presenting a surface angularly disposed relative to the path of movement of said retained member, said surfaces having substantially the same angular deposition relative to said path of movement, a joint forming member having surfaces at the ends thereof and adapted to be interposed between said retaining and retained members with its end surfaces engaging the surfaces of said retaining and retained members to limit the longitudinal movement of said retained member in one direction, said joint forming member unsupported between its ends and of such cross-sectional shape that when in compression each of its component sections behaves as a short column, all of said surfaces being so angularly disposed relative to the longitudinal path of movement of said retained member that said joint forming member under steady state conditions is subjected substantially solely to oppositely directed collinear forces in resisting movement of said retained member.

2. A vessel subjected in use to elevated internal pressures including an open ended, unreinforced cylindrical section of substantially constant thickness, a closure member movable longitudinally in said cylindrical section and closing said open end, an annular groove formed in the inner wall of said cylindrical section presenting a frusto-conical bearing surface generated by a line angularly disposed to the longitudinal axis of said cylindrical section, an annular shoulder formed in said closure member presenting a frusto-conical surface generated by a line substantially parallel to said first generating line, and a discontinuous ring member having frusto-conical surfaces at its ends adapted to seat respectively on the frusto-conical surfaces of said groove and said shoulder when said closure member is urged outwardly by pressure within said vessel, said ring member being out of contact between its ends with said cylindrical section and said closure member when said frusto-conical surfaces at its ends are seated respectively on said frusto-conical surfaces of said groove and said shoulder, said generating lines being at such an angle to the axis of said cylindrical section that in resisting the outward movement of said closure member under steady state conditions each section of said ring member is subjected substantially solely to oppositely directed collinear forces.

3. A vessel subjected in use to elevated internal pressures including an open ended, unreinforced cylindrical section of substantially constant thickness, a closure member movable longitudinally in said cylindrical section and closing said open end, an annular groove formed in the inner wall of said cylindrical section presenting a frusto-conical bearing surface generated by a line angularly disposed to the longitudinal axis of said cylindrical section, an annular shoulder formed in said closure member presenting a frusto-conical surface generated by a line substantially parallel to said first generating line, and a frusto-conical ring member having split, frusto-conical surfaces at its ends adapted to seat respectively on the frusto-conical surfaces of said groove and said shoulder when said closure member is urged outwardly by the pressure within said vessel, said ring member being out of contact between its ends with said cylindrical section and said closure member when said frusto-conical surfaces at its ends are seated respectively on said frusto-conical surfaces of said groove and said shoulder, said generating lines being at such an angle to the axis of said cylindrical section that in resisting the outward movement of said closure member under steady state conditions each component section of said ring member is subjected substantially only to oppositely directed collinear forces, the length and the width of said section of said ring member being so proportioned that the component sections of said ring member behave as short columns in resisting said collinear forces.

4. A vessel subjected in use to elevated internal pressures including an open ended, unreinforced cylindrical section of substantially constant thickness, a closure member movable longitudinally in said cylindrical section and closing said open end, an annular groove formed in the inner wall of said cylindrical section and defined by two intersecting frusto-conical surfaces, the generating line of one of said surfaces being disposed at an acute angle to a line normal to the axis of said cylindrical section and the generating line of the other of said surfaces forming an obtuse angle with said first generating line, an annular shoulder on said closure member including a frusto-conical surface generated by a line parallel to said first generating line, and a discontinuous frusto-conical snap ring of rectangular cross-section positionable in said groove and provided at its ends with frusto-conical surfaces generated by parallel sides of a generating rectangle, the cone angle of said ring being such that said frusto-conical surfaces of said ring seat respectively on said one frusto-conical surface of said groove and on said frusto-conical surface of said shoulder when said closure member is urged outwardly by the pressure within said vessel, said ring in seated position being in contact with said cylindrical section and said closure member only through said frusto-conical surfaces at its ends, said cone angle and said acute angle being such that each component section of said ring is subjected under steady state conditions substantially solely to oppositely directed collinear forces in resisting the outward movement of said closure member and the bending moments developed in said cylindrical section prior to achieving steady state conditions are comparatively small in the grooved portion and comparatively large in the ungrooved portion thereof.

References Cited in the file of this patent

UNITED STATES PATENTS

| | | |
|---|---|---|
| 2,252,488 | Bierend | Aug. 12, 1941 |
| 2,281,145 | Duey | Apr. 28, 1942 |
| 2,390,445 | Mercier | Dec. 4, 1945 |
| 2,401,856 | Brock | June 11, 1946 |

FOREIGN PATENTS

| | | |
|---|---|---|
| 713,502 | Germany | Nov. 13, 1941 |